(12) United States Patent
Tan

(10) Patent No.: US 8,635,836 B2
(45) Date of Patent: Jan. 28, 2014

(54) AIR CUSHION MANUFACTURING MACHINE

(76) Inventor: Kai-Yuan Tan, New Taipei (TW)

( * ) Notice: Subject to any disclaimer, the term of this patent is extended or adjusted under 35 U.S.C. 154(b) by 393 days.

(21) Appl. No.: 13/042,537

(22) Filed: Mar. 8, 2011

(65) Prior Publication Data

US 2012/0231940 A1 Sep. 13, 2012

(51) Int. Cl.
*B65B 31/04* (2006.01)

(52) U.S. Cl.
USPC ....... 53/79; 53/403; 53/433; 53/113; 493/967

(58) Field of Classification Search
USPC ......... 53/403, 432–434, 79, 111 R, 113, 562, 53/453, 455, 559; 493/967
See application file for complete search history.

(56) References Cited

U.S. PATENT DOCUMENTS

| | | | | |
|---|---|---|---|---|
| 3,698,154 A * | 10/1972 | Woodruff et al. | .................. | 53/73 |
| 4,141,196 A * | 2/1979 | Blanding | ........................ | 53/550 |
| 5,561,964 A * | 10/1996 | McIntyre et al. | .................. | 53/75 |
| 6,209,286 B1 * | 4/2001 | Perkins et al. | .................. | 53/403 |
| 7,536,837 B2 * | 5/2009 | Perkins et al. | ..................... | 53/79 |
| 8,061,110 B2 * | 11/2011 | Wetsch | .............................. | 53/79 |
| 2007/0251190 A1 * | 11/2007 | Daigle et al. | ..................... | 53/403 |
| 2010/0251668 A1 * | 10/2010 | Sperry et al. | .................... | 53/403 |
| 2012/0102877 A1 * | 5/2012 | Simmons et al. | ................. | 53/52 |

* cited by examiner

*Primary Examiner* — Christopher Harmon
(74) *Attorney, Agent, or Firm* — Rosenberg, Klein & Lee

(57) ABSTRACT

An air cushion manufacturing machine includes a film supply unit and a feed unit installed on a machine body and a sealing device for heat sealing an inflated double-layer film when the feed of the film stops. The manufacturing machine is characterized in that a solid state relay (SSR) is coupled to a power supply required by a heat sealer of the sealing device, and the solid state relay controlled by the processor compensates the heat loss of sealing according to the cycle of the sealing process, and a power-on time percentage is controlled to produce a punctuate periodic micro heating to the heat sealer and achieve a constant-temperature heat compensation for each sealing course of the heat sealer. The manufacturing machine is not affected by ambient temperature and is capable of improving the sealing effectiveness and overcome the drawback of conventional sealing devices that easily breaking an electrothermal wire.

7 Claims, 9 Drawing Sheets

AIR CUSHION MANUFACTURING MACHINE

BACKGROUND OF THE INVENTION (a) Field of the Invention

The present invention relates to an air cushion manufacturing machine, and more particularly to an air cushion manufacturing machine that carries out a punctuate periodic micro heating process to a heat sealer based on a circular sealing course, such that the heat sealer can achieve a constant heat compensation for each sealing course.

(b) Description of the Related Art

To overcome the problems of conventional packaging materials with a poor cushion effect or a serious pollution issue, manufacturers have developed an air cushion that seals air between two layers of films to form successive air columns, and thus the air cushion is a double-layer film with a side as a seal side and the other side as an open side, and the air cushion is manufactured by a manufacturing procedure comprising the steps of: circular intermittent air inflation→thermal sealing→feed.

The conventional sealing machines are mainly classified into two types: a direct heating type and an instant heating type, wherein the direct heating type sealing machine is applicable for a thicker material only and such sealing machine is coupled to a power supply and heated continuously, and thus wasting tremendous electric power. Therefore, most of the conventional air cushion manufacturing machines adopt the instant heat sealing method. However, the heat sealing method has the following drawbacks in the manufacture of the air cushion. In FIGS. 1 and 2, the power supply a supplies electric energy required by an electrothermal wire of the sealing device b and converts the electric energy into heat energy, and the sealing device b is coupled to a temperature sensor c, such that when the film is sealed, the temperature sensor c feeds a detected temperature signal back to the power supply a, but such signal feedback d usually causes a delay or an inaccuracy. The instant high temperature desired for sealing films will be advanced or delayed by a period, so that the electrothermal wire is not at the best heating temperature at the moment of sealing the films, and a low yield rate of sealing is resulted. Furthermore, the way of resupplying electric power to compensate the electrothermal wire after the electrothermal wire goes through the instant high temperature and cooling process may break or crack the electrothermal wire easily, and the lifespan may be reduced.

Obviously, the conventional air cushion manufacturing machine requires further improvements.

SUMMARY OF THE INVENTION

Therefore, a primary object of the present invention is to provide an air cushion manufacturing machine to overcome the shortcomings of the conventional way of resupplying electric power for the compensation after the heating and cooling processes by using the punctuate continuous micro heating, so that the required temperature can be maintained constant in each sealing course, and the yield rate of sealing can be improved to over 99%, and the effect of lowering the chances of breaking or cracking the electrothermal wire can be achieved effectively.

Another object of the present invention is to provide an air cushion manufacturing machine whose micro heating effect is not affected by external ambient temperature, and thus provide a higher accuracy. A variety of levels of heating temperature can be set and thermal parameters can be adjusted according to the type and thickness of the film. Thus, the constant-temperature module has the capability of sealing various types of films.

To achieve the foregoing objects, the present invention adopts the following technical measures:

The power supply required by the heat sealer of the sealing device is coupled to a solid state relay (SSR). The solid state relay controlled by the processor compensates the heat loss of sealing according to the cycle of the sealing process and a power-on time percentage of the power supply is controlled to perform the punctuate periodic micro heating process to the heat sealer, such that the heat sealer can achieve the constant-temperature compensation for each sealing course.

In addition, the heat sealer includes a nickel-chromium wire for the electric heating, but the present invention is not limited to such arrangement only. Further, the processor includes a heating level setting device connected to the processor.

With the aforementioned technical measure, the present invention uses the constant-temperature compensation module for heat sealing of the film to achieve a good sealing effect and an enhanced reliability of the manufactured air cushion, and prevent the electrothermal wire from being broken or cracked easily during the sealing process, so as to extend the lifespan of the machine.

DETAILED DESCRIPTION OF THE PREFERRED EMBODIMENT

Figure 1:
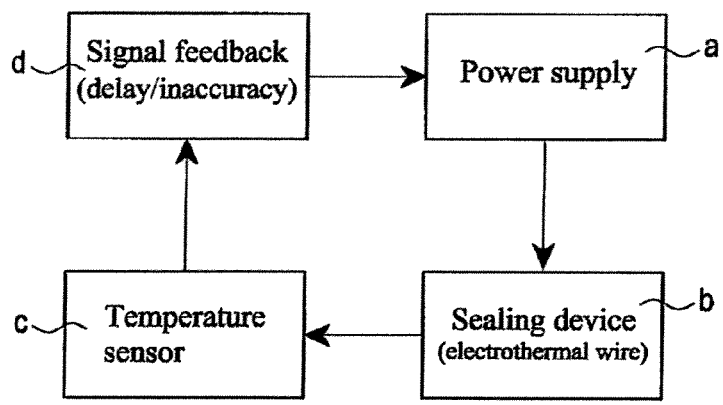
FIG. 1 is a closed loop block diagram of a conventional sealing device.
Figure 2:
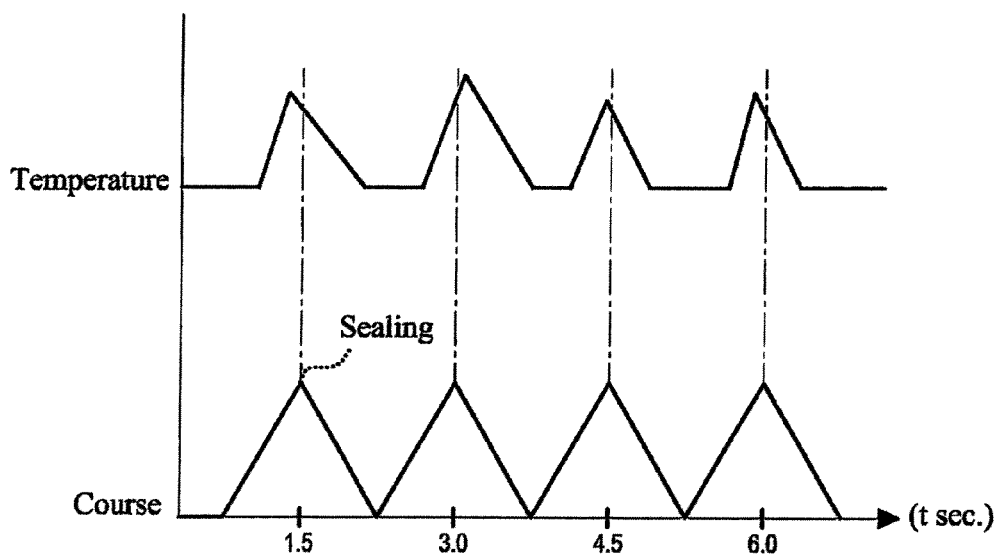
FIG. 2 shows mapping curves of corresponding sealing course and temperature of a conventional sealing device.
Figure 3:
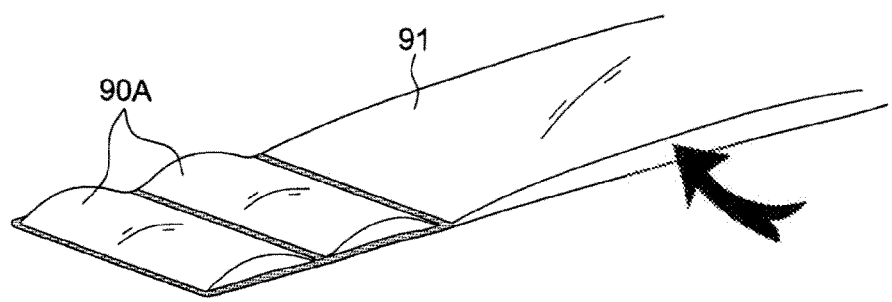
FIG. 3 is a schematic view of an air cushion manufactured in accordance with the present invention.
Figure 4:
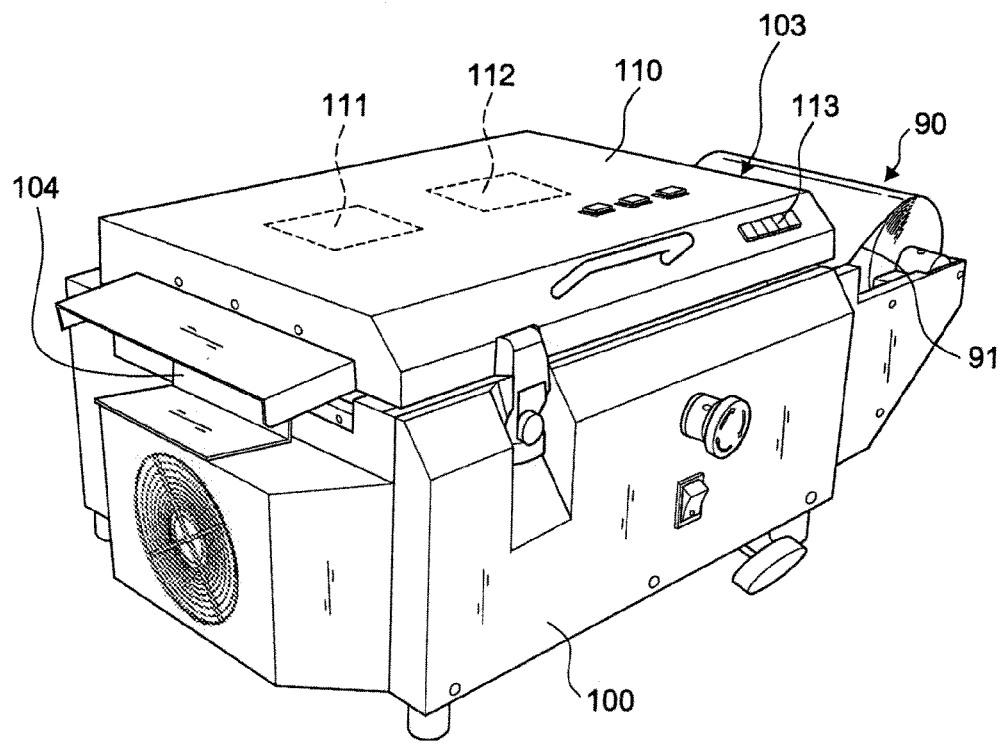
FIG. 4 is a perspective view of an air cushion manufacturing machine in accordance with a preferred embodiment of the present invention.
Figure 5:
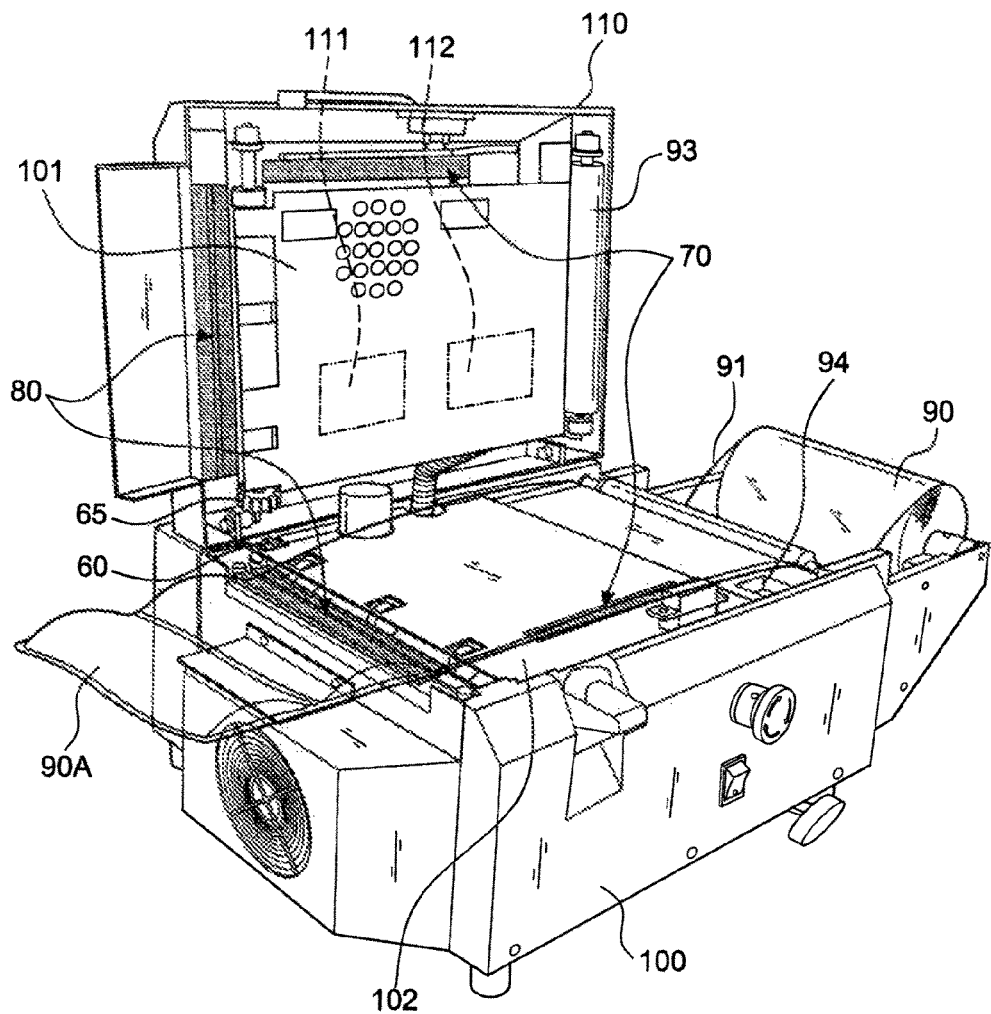
FIG. 5 is a perspective view of an air cushion manufacturing machine with its cover lifted open in accordance with a preferred embodiment of the present invention.
Figure 6:
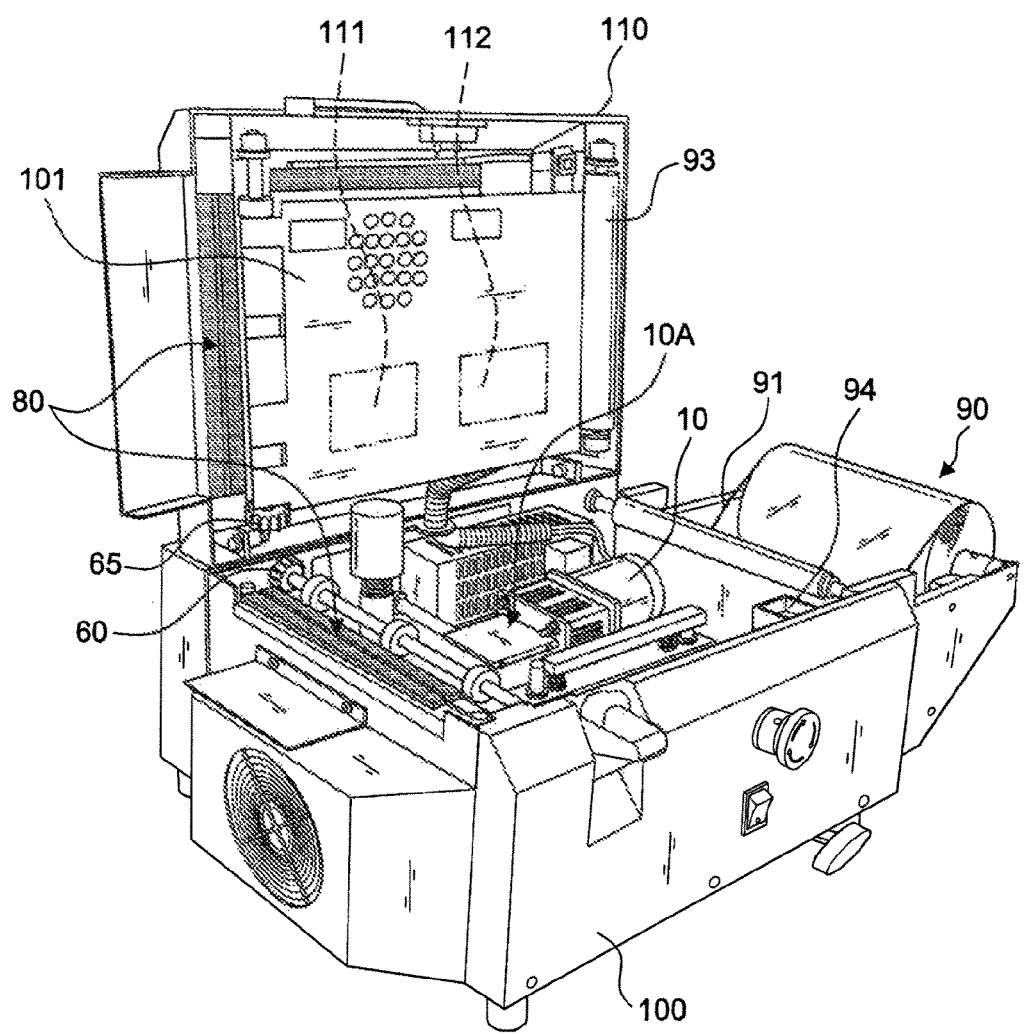
FIG. 6 is a perspective view of an air cushion manufacturing machine with its lower press plate removed in accordance with a preferred embodiment of the present invention.

With reference to FIGS. 3 to 7 for an air cushion manufacturing machine in accordance with a preferred embodiment of the present invention, the main function of the machine as shown in FIG. 3 is to feed a double-layer film 91 automatically, inflate the double-layer film 91, and heat-seal the film 91 to produce successive air columns 90A. In this automated manufacturing process, the constant-temperature heat compensation method of the heat sealing is also an important characteristic of the present invention, in addition to the mechanical transmission and the course control. The present invention basically comprises:

a machine body 100, having a cover 110 installed at the top side of the machine body 100 and liftable to the rear side, and an inlet 103 and an outlet 104 formed at both ends of the machine body 100 respectively;

a film supply unit 90, installed at the inlet 103 of the machine body 100, for allowing a double-layer film 91 with a sealed side and an open side to enter between the top of the machine body 100 and the cover 110, and the double-layer film 91 inflated by an inflating element 94;

a motor 10, installed in the machine body 100, and having a main shaft 12 for outputting kinetic power;

a transmission device 10A, driven by the motor 10 for driving the operation of a plurality of motion mechanisms;

a feed unit 60, separately installed at the top side of the machine body 100 and the bottom side of the cover 110, and driven by the transmission device 10A for driving the double-layer film 91 to feed in a direction towards the outlet 104; and a sealing device 70A, having a plurality of heat sealers 71, 81, and separately installed at the outlet 104 at the top side of the machine body 100 and the front side of the machine body 100, for performing lateral and transverse heat sealing of the inflated double-layer film 91 respectively when the double-layer film 91 stops its feeding, and the sealing device 70A having a sealing sensor 72 for sensing a sealing period; and a power supply 200, for supplying electric energy required by the sealing device 70A, such that the heat sealer 71, 81 converts the electric energy to heat energy.

Before the constant-temperature heat compensation of the present invention is described, the transmission device 10A as shown in FIGS. 8A to 8D is disclosed. The transmission device 10A is driven by an active bevel gear 11 installed on a main shaft 12 of the motor 10.

a transmission device 10A, including:

(a) a power multidirectional mechanism 20, for engaging a first driven bevel gear 24 installed at a first driven shaft 21 and a second driven bevel gear 25 installed at a second driven shaft 22 with the active bevel gear 11, and having a third driven shaft 23 installed on the same axis of the main shaft 12 and dynamically coupled to the main shaft 12, and the third driven shaft 23 being dynamically coupled to the main shaft 12 by a third driven bevel gear 26 installed and engaged between the first driven bevel gear 24 and the second driven bevel gear 25, or by a coupling (not shown in the figure);

(b) a swing motion mechanism 30, for pivotally coupling an end of a first crank 31 to the first driven shaft 21, an end of a first link rod 32 to the other end of the first crank 31, and the other end of the first link rod 32 to a lateral side of a swing gear 33;

(c) a first reciprocating motion mechanism 40, for pivotally coupling an end of a second crank 41 to the second driven shaft 22, an end of a second link rod 42 to the other end of the second crank 41, and the other end of the second link rod 42 to the bottom of a first elevating stand 43; and (d) a second reciprocating motion mechanism 50, for pivotally coupling an end of a third crank 51 to the third driven shaft 23, an end of a third link rod 52 to the other end of the third crank 51, and the other end of the third link rod 52 to the bottom of the second elevating stand 53.

Further, the feed unit 60 comprises:

a plurality of upper and lower feed rollers 61, 62, with roller surfaces attached to each other and disposed on upper and lower axles 63, 64 respectively, and having upper and lower feed gears 65, 66 engaged with each other and mounted on the upper and lower axles 63, 64 respectively, and the lower feed gear 66 being operated together with a one-way bearing, such that the lower feed gear 66 and the swing gear 33 constitute a power transmission relation, wherein if the lower feed gear 66 and the swing gear 33 cannot be engaged directly to constitute the power transmission relation, then a power transmission gear set 67 or an equivalent power transmission component is installed between the lower feed gear 66 and the swing gear 33.

Further, the sealing device 70A comprises:

(a) a lateral heat sealing unit 70, having a lateral heat sealer 71 disposed at the top of the first elevating stand 43, and the lateral heat sealer 71 being elevated together with the first elevating stand 43 to a top dead spot and being disposed on the same plane where the upper and lower feed rollers 61, 62 are attached, and an upper press plate 101 being installed at the top dead spot opposite to the lateral heat sealer 71; and (b) a transverse heat sealing unit 80, having a transverse heat sealer 81 disposed at the top of the second elevating stand 53, and the transverse heat sealer 81 being elevated together with the second elevating stand 53 to the top dead spot and disposed on the same plane where the upper and lower feed rollers 61, 62 are attached, and having the upper press plate 101 installed at the top dead spot of the transverse heat sealer 81.

Figure 7:
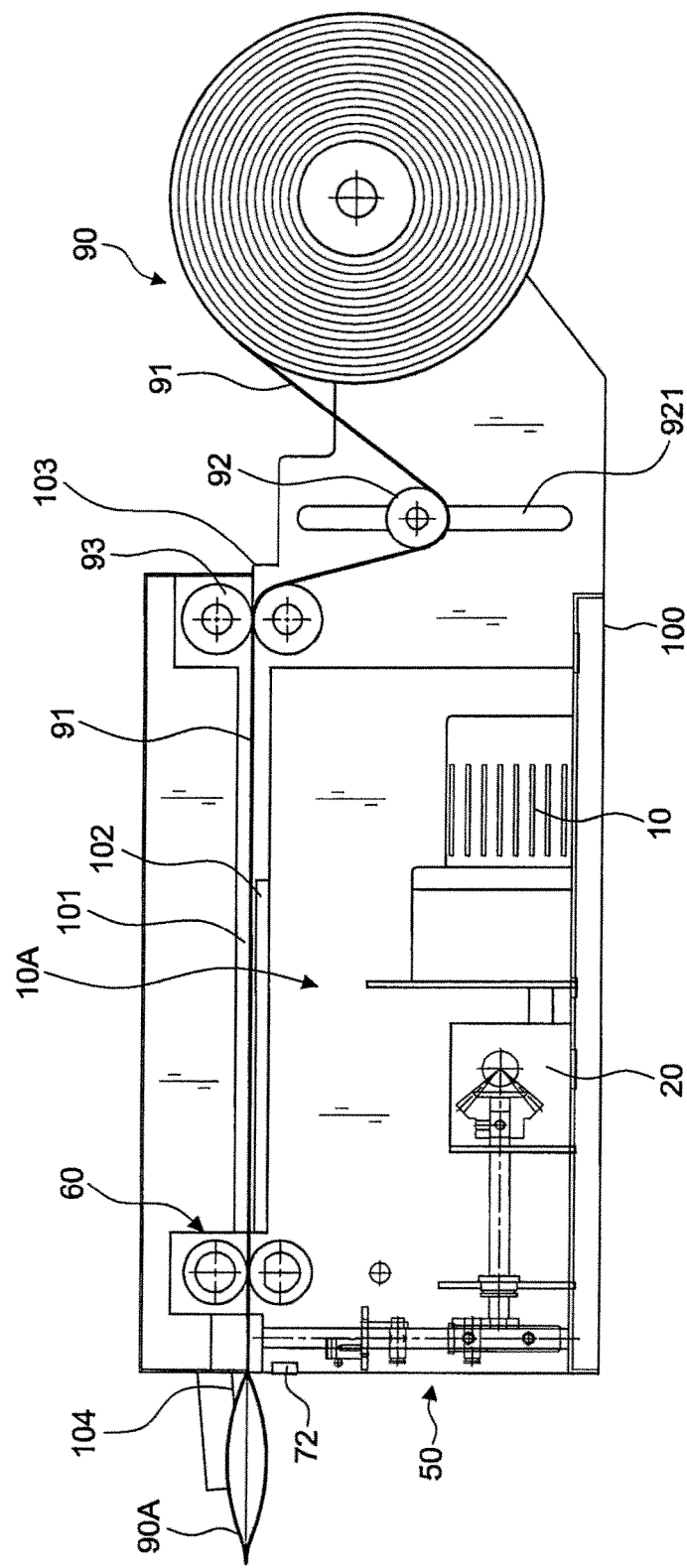
FIG. 7 is a side view of an air cushion manufacturing machine in accordance with a preferred embodiment of the present invention.
Figure 8A:
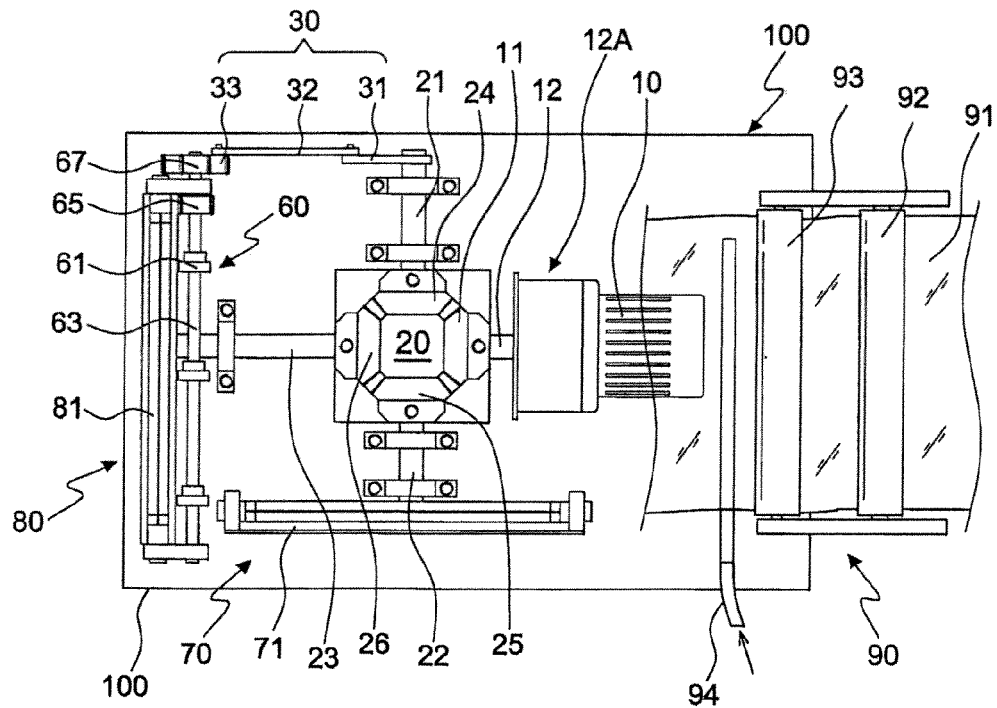
FIGS. 8 (A)~(D) are schematic views of a transmission device of the present invention.
Figure 8B:
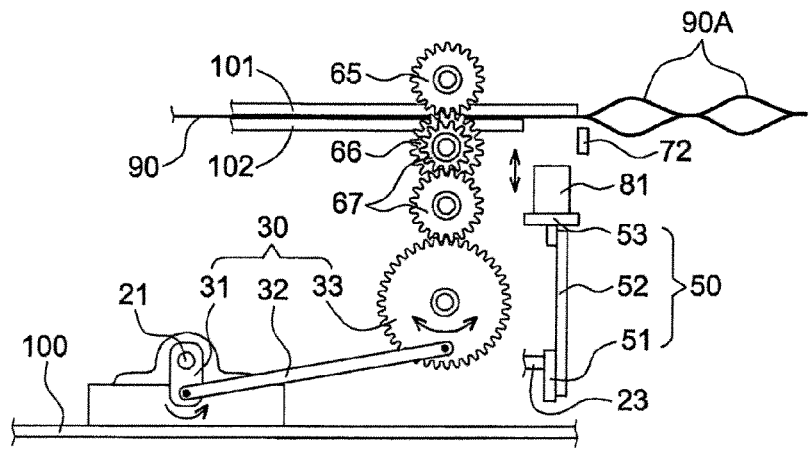
Figure 8C:
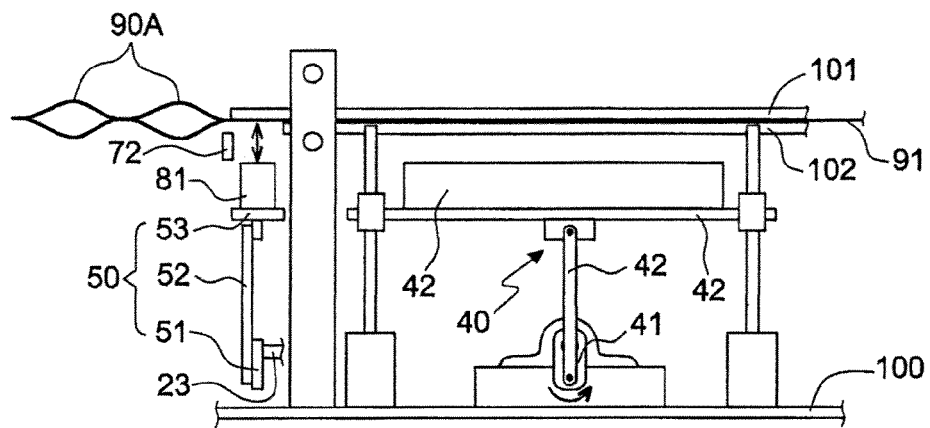
Figure 8D:
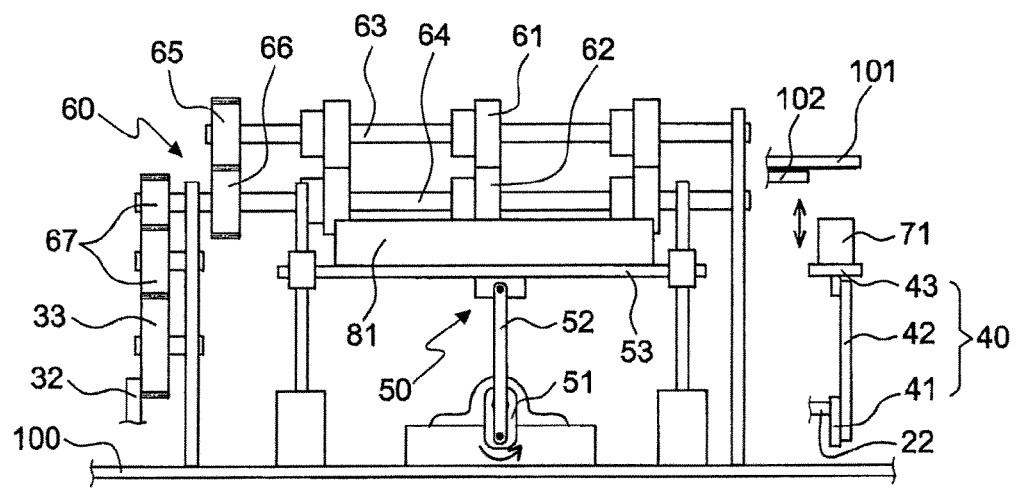

Further, a film supply unit 90 supplies a double-layer film 91 with a sealed side and an open side and disposed between the upper and lower press plates 101, 102, and an inflating element 94 is provided for inflating the double-layer film 91, and the feed unit 60 is provided for intermittently feeding the double-layer film 91. When the double-layer film 91 stops its feeding, the lateral heat sealing unit 70 and the transverse heat sealing unit 80 perform lateral and transverse heat sealing to the double-layer film 91. In this preferred embodiment as shown in FIG. 7, a press roller 92 slidable up and down in a longitudinal groove 921 is provided for maintaining the tension of the double-layer film 91 before the double-layer film 91 enters the upper and lower press plates 101, 102. In addition, the inlet 103 includes a pair of upper and lower corresponding pinch rollers 93.

Based on the foregoing assembly, the power multidirectional mechanism 20 of the present invention outputs the power of the single motor 10 synchronously into the first driven shaft 21, second driven shaft 22 and third driven shaft 23, and the motion mechanism coupled in different ways to each driven shaft 21, 22, 23 provides the effect of producing a multiple of motion modes by using a single motor.

However, the air cushion manufacturing machine of the present invention is coupled to a swing motion mechanism 30 and first and second reciprocating motion mechanism 40, 50 at the driven shafts 21, 22, 23 respectively, wherein the swing motion of the swing motion mechanism 30 in conjunction with the unidirectional transmission of the lower feed gear 66 of the feed unit 60 intermittently feeds the double-layer film 91 by a plurality of upper and lower feed rollers 61, 62 installed at the upper and lower axles 63, 64 respectively. In addition, the reciprocating motion of the first and second reciprocating motion mechanisms 40, 50 elevates the lateral heat sealer 71 of the lateral heat sealing unit 70 and the transverse heat sealer 81 of the transverse heat sealing unit 80 to the top dead point when the double-layer film 91 stops its feeding for performing the lateral and transverse heat sealing processes to the double-layer film 91 inflated by the inflating element 94, and the lateral heat sealer 71 and the transverse heat sealer 81 will be descended after the heat sealing process takes place, so as to allow the double-layer film 91 to be fed again, and the circular manufacturing process including the steps of inflation→heat sealing→feeding can be used for manufacturing the air cushion.

Figure 9:
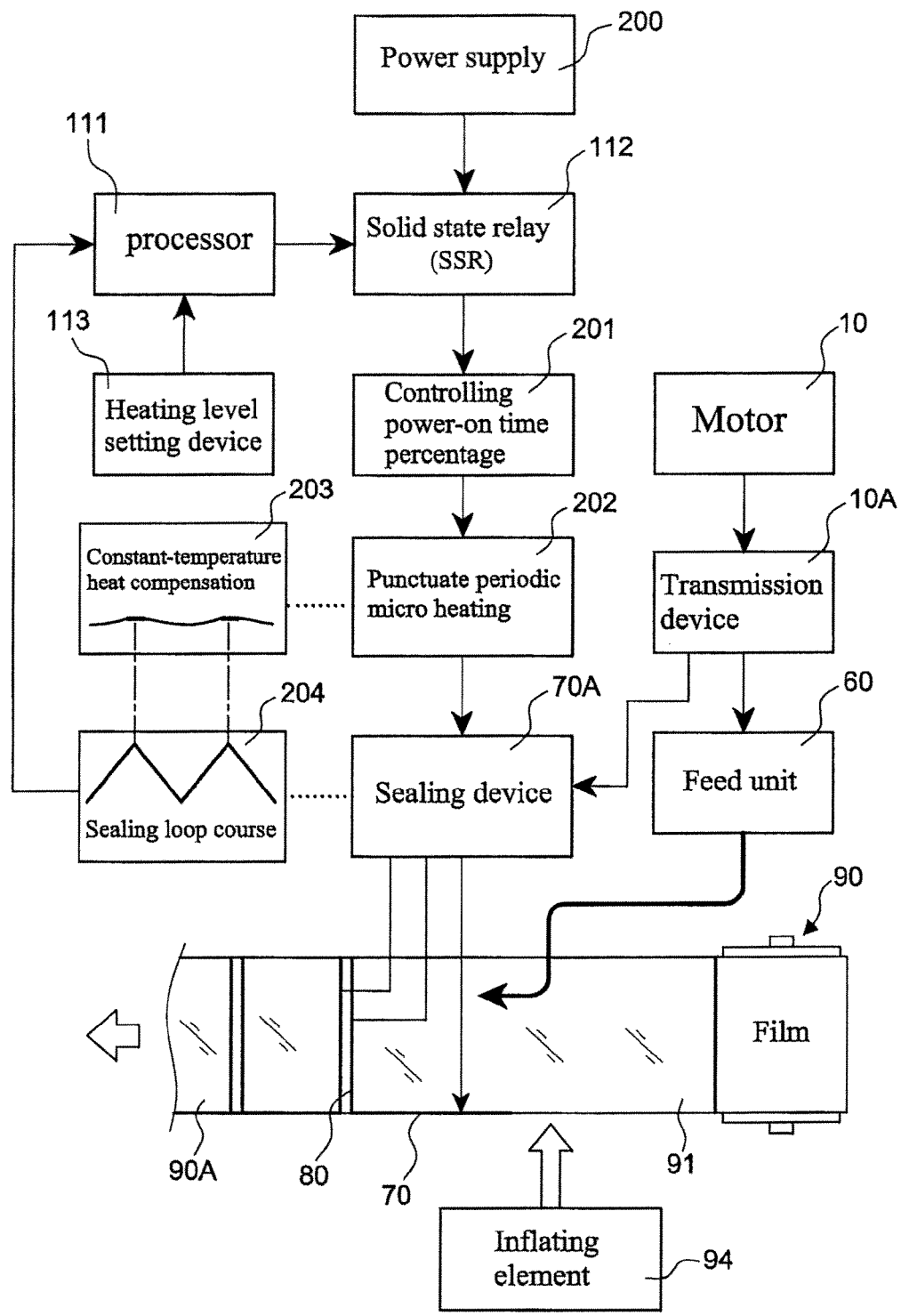
FIG. 9 is a block diagram showing the structure and control of the present invention.

In FIG. 9 and the other figures, the present invention is characterized in that:

The power supply 200 for supplying electric power required by each component of the machine body 100 is coupled to a solid state relay SSR 112, and the solid state relay 112 controlled by the processor 111 compensates the heat loss of sealing according to the cycle of the sealing process and controls its power-on time percentage 201 of the power supply 200, such that the power supply 200 can supply power to the heat sealers 71, 81 during a specific time period to produce a punctuate periodic micro heating 202, and the heat sealers 71, 81 can achieve a constant-temperature heat compensation 203 for each sealing course. The period of the sealing is detected by the sealing sensor 72, and a signal of the detection is transmitted to the processor 111.

The heat sealers 71, 81 include nickel-chromium wires or wires made of an equivalent material that can be heated by electric power. The processor 111 includes a heating level setting device 113 coupled to the processor 111 and set by a signal provided by the processor 111 to the solid state relay 112 for responding the duty cycle instruction. In other words, the duty cycle instruction represents that the SSR must have the time percentage required for a power-on 200 to assure that the temperature of the heat sealer falls within the set limit, so that the heat sealers 71, 81 can achieve the constant-temperature heat compensation effect for each sealing course.

The processor 111 and the solid state relay 112 can be installed in the cover 110, and the heating level setting device 113 can be installed on the machine body 100.

Figure 10:
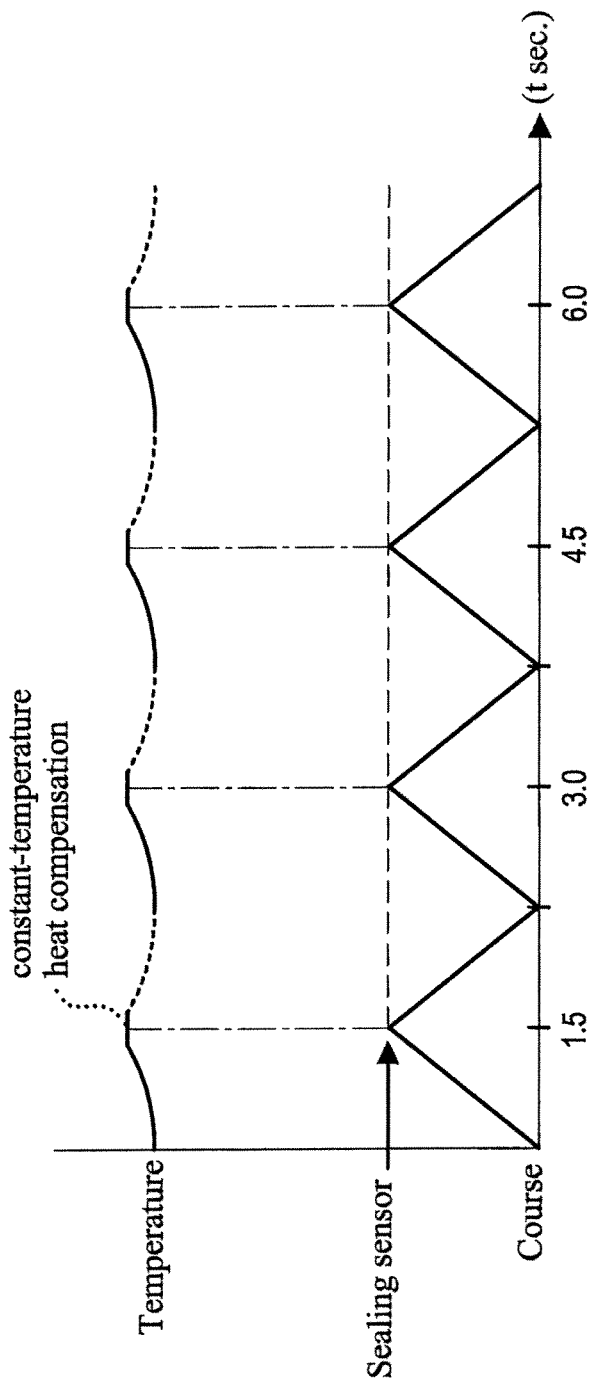
FIG. 10 shows mapping curves of corresponding sealing course and temperature of the present invention.

With reference to FIG. 10 for mapping curves of corresponding sealing path and temperature of the present invention, the aforementioned technical measures of the present invention overcome the drawback of the conventional way of supplying electricity to heat for the compensation every time after cooling, and the punctuate continuous micro heating can achieve the effects of maintaining a constant temperature for each sealing course, improving the yield rate of sealing effectiveness to over 99%, and reducing the easiness of breaking the electrothermal wire.

In addition, the micro heating of the present invention is not affected by external ambient temperature to provide higher precision, and the micro heating can be divided into a plurality of levels for setting the heating temperature, and the thermal parameters of the micro heating can be adjusted according to the type and thickness of the film, so that the constant-temperature module has the effect of heat sealing any film.

Many changes and modifications in the above-described embodiments of the invention can, of course, be carried out without departing from the scope thereof. Accordingly, to promote the progress in science and the useful arts, the invention is disclosed and is intended to be limited only by the scope of the appended claims.

What is claimed is:

1. An air cushion manufacturing machine, comprising:
a machine body, having a cover installed to the top side of the machine body and liftable to the rear side of the machine body, and an inlet and an outlet formed at both ends of the machine body respectively;
a film supply unit, installed at the inlet of the machine body, for allowing a double-layer film with a sealed side and an open side to enter between the top side of the machine body and the cover, and the double-layer film being inflated by an inflating element;
a motor, installed in the machine body, and having a main shaft for outputting kinetic power;
a transmission device, driven by the motor, for driving the operation of a plurality of motion mechanisms;
a feed unit, separately installed on the top side of the machine body and the bottom side of the cover, and driven by the transmission device, for driving the double-layer film to feed towards the outlet;
a sealing device, having a plurality of heat sealers, separately installed at the outlet on the top side of the machine body and the front of the machine body, for performing lateral and transverse heat sealing processes to the inflated double-layer film when the double-layer film stops its feeding; and
a power supply, for supplying electric energy required by the sealing device, such that the electric energy is converted into heat energy required by the heat sealer, characterized in that the power supply is coupled to a solid state relay (SSR), and the solid state relay controlled by the processor compensates the heat loss of the sealing according to the cycle of the sealing process and a power-on time percentage is controlled to produce a punctuate periodic micro heating to the heat sealer to achieve a constant-temperature heat compensation for each sealing course of the heat sealer;
wherein the main shaft of the motor includes an active bevel gear; and the transmission device further comprises:
a power multidirectional mechanism, for engaging a first driven bevel gear installed at the first driven shaft and a second driven bevel gear installed at the second driven shaft with the active bevel gear, and having a third driven shaft installed on the same axis of the main shaft and dynamically coupled to the main shaft;
a swing motion mechanism, for pivotally coupling an end of a first crank to the first driven shaft, an end of a first link rod to the other end of the first crank, and the other end of the first link rod to a lateral of a swing gear;
a first reciprocating motion mechanism, for pivotally coupling an end of a second crank to the second driven shaft, an end of a second link rod to the other end of the second crank, and the other end of the second link rod to the bottom of a first elevating stand; and
a second reciprocating motion mechanism, for pivotally coupling an end of a third crank to the third driven shaft, an end of a third link rod to the other end of the third crank, and the other end of the third link rod to the bottom of the second elevating stand;
the feed unit further comprises:
a plurality of upper and lower feed rollers, with roller surfaces attached to each other and installed at the upper and lower axles respectively, and having upper and lower feed gears engaged with each other and mounted on the upper and lower axles respectively, and the lower feed gear being operated together with a one-way bearing, such that the lower feed gear and the swing gear constitute a power transmission relation;
the sealing device further comprises:
a lateral heat sealing unit, having a lateral heat sealer disposed at the top of a first elevating stand, and having an upper press plate installed at a top dead spot opposite to the lateral heat sealer; and
a transverse heat sealing unit, having a transverse heat sealer disposed at the top of the second elevating stand, and having an upper press plate installed at the top dead spot opposite to the transverse heat sealer.

2. The air cushion manufacturing machine as recited in claim 1, wherein the sealing device includes a sealing sensor.

3. The air cushion manufacturing machine as recited in claim 1, wherein the heat sealer includes a nickel-chromium wire heated by electric power.

4. The air cushion manufacturing machine as recited in claim 1, wherein the processor includes a heating level setting device coupled to the processor.

5. The air cushion manufacturing machine as recited in claim 1, wherein the third driven shaft is coupled to the main shaft by a third driven bevel gear installed and engaged between the first driven bevel gear and the second driven bevel gear, or dynamically coupled to the main shaft by a coupling.

6. The air cushion manufacturing machine as recited in claim 5, wherein the lower feed gear is engaged directly with the swing gear, or a power transmission gear set or an equivalent power transmission component is installed between the lower feed gear and the swing gear to constitute a power transmission relation.

7. The air cushion manufacturing machine as recited in claim 1, wherein the lateral heat sealer and the transverse heat sealer having top dead spots formed on the same plane where the upper and lower feed rollers are attached.

\* \* \* \* \*